United States Patent [19]

Watson

[11] 4,126,429
[45] Nov. 21, 1978

[54] CO-FUSED ALUMINA-ZIRCONIA ALLOY ABRASIVE CONTAINING MAGNESIUM OXIDE

[75] Inventor: George R. Watson, Niagara Falls, Canada

[73] Assignee: Norton Company, Worcester, Mass.

[21] Appl. No.: 813,318

[22] Filed: Jul. 6, 1977

Related U.S. Application Data

[63] Continuation of Ser. No. 640,351, Dec. 15, 1975, abandoned, which is a continuation of Ser. No. 487,717, Aug. 11, 1974, abandoned.

[51] Int. Cl.$^2$ .......................... C09C 1/68; C09C 3/04
[52] U.S. Cl. ............................ 51/309 R; 51/298 R; 106/57; 106/62
[58] Field of Search ..................... 51/298, 309; 106/57, 106/58, 65, 62

[56] References Cited

U.S. PATENT DOCUMENTS

| | | | |
|---|---|---|---|
| 3,861,849 | 1/1975 | Richmond et al. | 51/309 |
| 3,891,408 | 6/1975 | Rowse et al. | 51/298 |

Primary Examiner—Donald J. Arnold
Attorney, Agent, or Firm—Rufus M. Franklin

[57] ABSTRACT

An abrasive material giving improved results when employed as the abrasive grit in grinding wheels employed for heavy duty snagging of carbon steels and stainless steels is produced by the rapid quenching of a fusion of a mixture of alumina, zirconia, and magnesia, the zirconia content being 22 to 28%, by weight, and the weight ratio of magnesia to alumina being between 0.014 and 0.029. The solidified product is impact crushed to produce coarse abrasive grits in the grit size range appropriate for heavy duty snagging.

2 Claims, No Drawings

CO-FUSED ALUMINA-ZIRCONIA ALLOY ABRASIVE CONTAINING MAGNESIUM OXIDE

This is a continuation, of application Ser. No. 640,351, filed Dec. 15, 1975 now abandoned, which is a continuation of Ser. No. 487,717, filed July 11, 1974, now abandoned.

FIELD OF THE INVENTION

The invention relates to a new high purity, microcrystalline fused alumina-zirconia alloy abrasive grit material containing controlled amounts of magnesium oxide and to methods for its production.

BACKGROUND OF THE INVENTION

Co-fused alumina-zirconia abrasives went into commercial use in the early 1960's and are described in U.S. Pat. No. 3,181,939.

Improvements in such abrasives are described in Rowse and Watson U.S. Application Ser. No. 386,718 now Pat. No. 3,891,408 filed Aug. 8, 1973, Page 3, line 10, which discloses the addition of up to 4% magnesia in a cofusion of alumina and zirconia containing from 35 to 50% zirconia. Coes U.S. Pat. No. 3,498,769 discloses co-fused spinel-zirconia abrasive materials (spinel being magnesium aluminate). German Published application No. 2,212,311, published Oct. 26, 1972, suggests the additions of magnesia, among other things, in unspecified amounts to alumina-zirconia fusions. Japanese Pat. Publication, No. 14959, of July 15, 1970 discloses adding lime or magnesia stabilized zirconia to bauxite, fusing the mixture in the presence of carbon, and solidifying and crushing the product. The crushed material is then calcined at 1300° C to strengthen it. The zirconia is stated to be stabilized in the cubic crystallographic form, in order for it to tolerate the calcination operation.

Alumina-zirconia available commercially prior to this invention has included material which has contained minor amounts of magnesia (less than 0.5% MgO by weight) carried over as an impurity from the raw materials employed.

SUMMARY OF THE INVENTION

The product of the present invention is a high purity co-fused alumina-zirconia, containing from 22 to 28% zirconia and an amount of magnesia (in the range of 1 to 2% by weight) such that the magnesia to alumina weight ratio in the product is from 0.014 to 0.029. It is essential that the product be of high purity, and be rapidly cooled to produce in which the abrasive grits are polymicrocrystalline.

By high purity we mean that the normal impurities present in the raw material sources for alumina and zirconia should be reduced, either before or during the fusion operation, to a level such that the silica content in the solidified product is below 0.5% by weight. Typically this means that the titania will be below 2%, iron 0.3% and below, and any other impurities will be generally below 0.2%. Soda should be below 0.1%. The preferred raw materials for use in the invention are high purity alumina (such as Bayer process alumina, made by chemical purification of bauxite) and a relatively high purity source of $ZrO_2$ such as baddelyite or fused zirconia made by fusing zircon sand and removing silica in the fusion process, as known in the art. In the sources of zirconia employed in the tests reported herein, hafnia was present in an amount of about 2 parts per hundred parts of zirconia, by weight. Thus the products described herein are assumed to contain about 0.5% by weight of hafnia, which is not reported in the analyses. Any hafnia present is believed, for the purposes of the invention, to be equivalent to the zirconia.

The rate of cooling of the product is important, and the methods of cooling disclosed in Rowse-Watson application Ser. No. 386,718 are employed in this invention. Sufficiently rapid cooling is achieved by pouring the melt into the interstices of a packed mass of carbon steel balls 1.5 inches (38 mm) in diameter or smaller, or between carbon steel plates, spaced 3/16 inches apart (5 mm) or closer. The rapidity of cooling (other things being equal) determines the size of the crystal structure of the product. Specifically, the cooling rate must be high enough to produce a solid product in which the rod like (and sometimes plate-like) zirconia crystallites in the alumina-zirconia eutectic have a rod to rod or plate to plate spacing of less than 4000 Angstroms as measured at the eutectic colony centers by the random intercept technique. The product also contains colonies of spinel-zirconia eutectic, in which the rod spacing is finer than in the alumina-zirconia eutectic. This may conveniently be seen from a photomicrograph, of a polished section of the material, made by the use of a scanning electron microscope, at magnifications of between 5000 and 20,000 diameters.

The solidified abrasive is impact crushed to produce strong abrasive grits in the desired size range (say 10 to 24 grit) when the abrasive is intended for use in grinding wheels intended for severe grinding applications such as heavy duty grinding. Where the abrasive is intended for use in coated abrasives (such as belts, or discs) the product may be jaw crushed and selectively screened (as by a slotted screen or by a Sutton table) to obtain elongated grits.

Other operations, such as mulling or pan milling may be performed on grits which are intended for heavy duty grinding.

DESCRIPTION OF SPECIFIC EMBODIMENTS OF INVENTION

EXAMPLE I (s8007, Run A857c)

The furnace feed for this example consisted of 100 pound batches, composed as follows:

| | | |
|---|---|---|
| zirconia ore | 25.875 | parts by weight |
| calcined Bayer process alumina | 75.375 | " |
| magnesia | 2.0 | " |
| lime | 0.3 | " |
| Barley coal | 1.25 | " |

(1/16 to 1/32 inch diameter anthracite coal granules)

The zirconia ore contained about 2% hafnia by weight, in addition to the following impurities:

| | |
|---|---|
| $SiO_2$ | 0.42% |
| $Fe_2O_3$ | 0.21 |
| $TiO_2$ | 0.22 |
| CaO | 0.06 |
| MgO | 0.09 |
| $Al_2O_3$ | 0.20 |
| $Na_2O$ | 0.01 |

The magnesia contained 98 + 0 MgO, plus the following impurities:

| | |
|---|---|
| $SiO_2$ | 0.40% |
| $Fe_2O_3$ | 0.24 |
| $TiO_2$ | 0.02 |
| $Al_2O_3$ | 0.22 |
| $CaO$ | 0.86 |

A fusion was made in the conventional manner in a 4 cubic foot arc furnace arranged for pouring of the molten contents. The furnace was equipped with 2 four inch diameter carbon electrodes spaced eight inches apart (center to center) and was operated at 93 volts, and 190 kilowatts. The average feed rate was 185 per hour. The product was poured into the spaces between plates, spaced 3/16 inches (4.8 mm) apart.

The chemical analysis of the product was as follows:

| | |
|---|---|
| MgO | 1.42% |
| CaO | 0.13 |
| $SiO_2$ | 0.17 |
| $Fe_2O_3$ | 0.12 |
| $TiO_2$ | 0.09 |
| $ZrO_2$ | 25.68 |
| $Na_2O$ | 0.07 |
| S | 0.0146 |

Although not analyzed for, the product contained about 0.5% hafnia, from the zirconia source. Thus it contained 71.8%, alumina (by difference).

The resulting product, after cooling, impact crushing, and shaping in a pan mill had a density of 4.26 g/cc, a packed bulk density for $-10 + 12$ screen size of 145.4 pounds per cubic foot, and a $k$ (impact) value at 3000 rpm (314 ft. per second) of 0.23. The $k$ value is a measure of the strength of the grain, the lower the value, the stronger the grain, and the method for determining it is as follows.

A test sample is prepared from the crude abrasive by crushing and screening. The test sample comprises the part of the crushed abrasive that is retained between two specified adjacent screens in the Tyler series, after screening for one-half hour with a Tyler Ro-Tap sieve shaker (available from W. S. Tyler Co., Cleveland, Ohio). The sample weight is chosen to provide about 10,000 individual abrasive grits. For 14 grit, typically used for impact testing, a 100 gram sample is adequate.

The grains are dropped essentially one at a time, into an evacuated chamber (e.g. 2 mm $H_g$), in which they are struck in direct central impact by a mild steel vane that is moving at a predetermined velocity. The grain is driven by the impact into a collecting pot. Secondary impact is minimized by lining all the adjacent metal surfaces with gasket rubber.

When impacted in this way the grains break down in a manner described by the following equation:

$$R = (1 - \frac{x}{x_o})^k,$$

in which R is the fraction by weight of the grain remaining on a given screen having openings of the dimension $x$; $x_o$ is the effective initial size of the grains (before impact), and k is a dimensionless number which can be considered representative of the number of flaws in the material being tested.

The grain that has been collected in the pot is then screened for one-half hour on a nest of Tyler screens (adjacent sizes) in a Ro-Tap Shaker to determine the post-impact size distribution in terms of weight of grain on each screen and on the pan. In the determinations of $k$ referred to herein, the paddle center was twelve inches radially from the center of rotation, and its speed was 3000 revolutions per minute, corresponding to a speed of 314 feet per second.

In an actual determination of a k value, typically four screens would be used with a pan beneath them in the Ro-Tap machine. The first screen (arbitrarily denominated the "0" screen) is the screen upon which the test material was retained in the sizing operation. The succeeding screens, denominated 1, 2, 3, 4 etc. are each smaller than the preceding screen by the factor 1.189 (the fourth root of 2), in the Tyler screen system. This fact can be used to simplify calculations by preparing tables of values of the reciprocal of the logarithm of $1 - (x/x_o)$ for various values of $x_o$ (which normally will be between 1 and 1.5, when the "0" screen is arbitrarily assigned the value of 1 unit for its opening size).

The weights of grain on the several screens are recorded in order, starting with the "0" screen, and the cumulative fractions, R, of the total sample by weight on each screen are calculated. A value of $x_o$, say 1.02, is arbitrarily selected and from R for each screen, $k$ is calculated from the formula:

$$k = \frac{\log R}{\log(1 - x/x_o)},$$

for each vlue of R. If the values of $k$ are the same for each R, then the correct $x_o$ has been chosen, and $k$ and $x_o$ are known. If the values of $k$ differ by more than one unit in the third decimal place, a new value of $x_o$ is chosen. This is repeated until k is determined with the desired degree of accuracy.

Another measurable property of abrasive materials is the "destructability factor" or "$\underline{a}$" value, defined by the equation:

$$M = KPV \frac{W}{W + a} \quad (1)$$

This equation represents the relationship, between wheel wear rate W, in cubic inches per hour, and material removal rate, M, in pounds per hour, where P is the vertical force in pounds on the grinding wheel, V is the surface speed of the wheel in feet per minutes, K is a constant which represents the grindability of the metal being ground, and $\underline{a}$ is the before mentioned "destructability factor" having the units of cubic inches per hour. The equation represents the optimum metal removal rate for an abrasive of given value of $\underline{a}$ a for fixed pressure and wheel speed, at any given wheel wear rate W. In grinding tests it is convenient to calculate PV/M and 1/W from measurements of M and W. When plotted with PV/M on the Y axis and 1/W on the X axis, the result is astraight line passing through 1/K on the Y axis and whose slope is $\underline{c}$/K. The K values for test metals may be known from previous tests or may be determined by obtaining grinding results for a given wheel with a known $\underline{a}$ value or by measuring metal removal at more than one wheel wear rate (by varying speed, pressure, or hardness of the wheel bond) so that at least two points are determined to fix the straight line on the plot of PV/M vs. 1/W.

In the particular English and engineering units employed, the dimensions of the constant K are: 60 pounds per foot pound. Obviously any consistant units having consistent dimensions can be employed, in such case the numerical values of K and $\underline{a}$ will of course be different from those employed herein. A theoretical discussion and derivation of equation (1) is given in the book: "Abrasives," by Loring Coes, Jr. published in 1971 by Springer-Verlag, Vienna and New York. In essence the equation states that the rate of metal removal is directly proportional to the energy applied to the wheel (PV) if there is no wear of the abrasive ($\underline{a} = o$). That is for the "perfect"abrasive, M = KPV. Since the value of $\underline{a}$ is always some number larger than zero, the metal removal rate will, in fact, not be equal to KPV but will be reduced by an efficiency factor equal to W/ (W + $\underline{a}$). Thus, the smaller the value of $\underline{a}$ the better potentially is the abrasive. The rate of metal removal given by equation (1) is that achieved when the abrasive is used at its optimum efficiency. If the bond is too soft or the abrasive too weak for the given grinding conditions, the metal removal rate will be less than that predicted by equation (1), and the abrasive will not perform at its true potential.

For example, an abrasive grit may fracture during grinding in such a way that is not effectively utilized in the wheel. This may be because the abrasive is inherently too weak or is inadequately bonded for the particular grinding conditions, or it may be too splintery. That is, it may be of too weak a shape for the particular bond employed in the wheel.

Thus the inherent strength of the abrasive is an important property, which influences, along with the properties of the wheel bond and the "destructability factor" $\underline{a}$, the wear rate (and the cutting rate) of a grinding wheel under a given set of grinding conditions. The dimensionless k value, or impact strength, described above (not to be confused with the grindability, K, of a metal) is a measure of the strength of the abrasive grit. The particular value of $k$ for any given abrasive is dependent both upon the inherent strength of the material in resisting impact fracture, and the shape of the grit.

From the above it can be seen that for heavy duty grinding, such as snagging, where high speeds and forces are applied, the measurable properties of the abrasive which are important to performance are impact strength, K, and destructability factor, $\underline{a}$. As pointed out by Coes, low destructability factors ($\underline{a}$ values) are correlateable to high melting points for certain classes of abrasives.

The abrasives of the present invention is fused abrasive of novel composition, high strength, and low $\underline{a}$ value, particularly suitable for use in organic bonded grinding wheels for heavy duty grinding, such as the snagging of steel billets. Elongated grits (weak shape) are also useful in the manufacture of coated abrasives (e.g. abrasive belts).

The packed bulk density is determined by measuring the weight and bulk volume of a sample of the abrasive grit in a container which has been tapped repeatedly to settle the grits into a packed condition. A calibrated cylindrical container 4 inches in inside diameter and 15-13/16 inches high is clamped to a heavy steel disc. The disc is mounted in a holder and the plate and container are jolted by a cam at the rate of 100 jolts per minute, with a free fall of 5/64 inches. A hopper is mounted above the top of the calibrated can. An amount of grain in excess of the calibrated content of the cylinder is placed in the hopper. A gate in the bottom of the hopper, uncovering an opening ⅜ inch in diameter is opened and the jogging of the cylinder is simultaneously started. The cylinder is allowed to fill and is kept full during the jolting. The jolting is continued for 590 jolts, and the excess grain is scraped from the top of the cylinder with a straight edge. The weight per cubic foot is then determined by weighing the contents of the cylinder, which has previously been precisely calibrated as to volume.

Laboratory and limited field test evaluations of the abrasive of this invention in standard phenolic bonded wheels indicate an improvement of as much as 50 percent increase in grinding ratio relative to standard commercial co-fused alumina-zirconia without addition of magnesia, but cooled from the melt at the same rate and identically processed.

In addition, an improvement of 70% can be achieved when the abrasive of this invention is calcined prior to its incorporation in grinding wheels. This is an unexpected result since calcination, under the same condition, of the standard commercial product results normally in a reduction in the quality of the abrasive for heavy duty snagging purposes.

The calcination is carried out in air or in an inert atmosphere. In air, calcination at 1000° C is fully effective, and can be carried out at 1250° C. In nitrogen calcination at 1250° C is fully effective to produce the improvement. In general, calcination above 800° C and under 1400° C is effective.

The magnesia content is relatively critical in this invention. Additions of greater than 2% and less than 1%, at the 25% zirconia level result in products no better, or poorer than the material with no magnesia additions. Experimental evidence also indicates that a maximum improvement exists in the vicinity of 25% zirconia, the improvement falling off at levels immediately below 22% and above 28%.

In addition, it has been found that if, instead of (or in addition to) impact crushing the solidified, rapidly cooled product from the furnace, the material is rolls crushed and selected elongated shaped grit is employed in coated abrasive applications, such as belts, discs, or sheets, that significantly improved results are achieved in grinding of carbon steels, as compared to a similarly prepared coated abrasive disc made with an abrasive of the same chemical composition and method of preparation, but without any MgO addition. The grain was not heat treated. Heat treatment, in coated abrasive applications was found to destroy the effectiveness of the grain.

In the abrasive of the present invention, the zirconia phase contains no significant amount of either the magnesia for lime present in the abrasive. It is believed that all or most of the magnesia is present in the form of spinel, magnesia deficient spinel, or is present in solid solution in the alumina. A small amount of the magnesia may be present in the boundary phase materials between eutectic colonies or between primary alumina crystals and adjacent phases. Since the magnesia occurs essentially in association or combination with alumina in the system, it is believed that the ratio of magnesia to alumina, in a system containing 22 to 28% zirconia is definitive of the chemical composition of the system.

With respect to any lime (CaO) present in the composition examination of the product shows that it occurs, not in association with the zirconia, but in segregated areas within the boundary phases (between colonies) in the solidified material.

What is claimed is:

1. Multicrystalline alloy abrasive grit sized particles solidified from a co-fusion of alumina, zirconia, and magnesia, the weight ratio of magnesia to alumina being from 0.014 to 0.029, the zirconia content being from 22 to 28% by weight, said zirconia being present in alumina-zirconia and spinel-zirconia eutectic colonies, all of said magnesia being present in association with alumina or in boundary phases in the grits, the product being microcrystalline such that the average zirconia rod spacing in the eutectic mixture measured at the eutectic colony centers is no greater than 4000 Angstroms.

2. Abrasive grit particles as in Claim 1 which have been calcined at from 800° C to 1300° C.

* * * * *